(12) United States Patent
Ozaki et al.

(10) Patent No.: US 11,258,963 B2
(45) Date of Patent: Feb. 22, 2022

(54) IMAGE CREATION DEVICE AND IMAGE CREATION METHOD

(71) Applicant: DENSO CORPORATION, Kariya (JP)

(72) Inventors: Yoshinori Ozaki, Kariya (JP); Hirohiko Yanagawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/011,763

(22) Filed: Sep. 3, 2020

(65) Prior Publication Data
US 2020/0404191 A1    Dec. 24, 2020

Related U.S. Application Data

(63) Continuation of application No. PCT/JP2019/007827, filed on Feb. 18, 2019.

(30) Foreign Application Priority Data

Mar. 5, 2018   (JP) .............................. JP2018-038581

(51) Int. Cl.
  *H04N 5/262*   (2006.01)
  *H04N 13/156*  (2018.01)
  (Continued)

(52) U.S. Cl.
  CPC ....... *H04N 5/2628* (2013.01); *G06K 9/00201* (2013.01); *G06K 9/00791* (2013.01);
  (Continued)

(58) Field of Classification Search
  None
  See application file for complete search history.

(56) References Cited

U.S. PATENT DOCUMENTS

2014/0152774 A1*   6/2014   Wakabayashi .......... G06T 3/005
                                                              348/46
2016/0080699 A1*   3/2016   Scholl ...................... B60R 1/00
                                                             348/148
(Continued)

FOREIGN PATENT DOCUMENTS

JP       2006-333009 A       12/2006
JP       2007-295043 A       11/2007
(Continued)

OTHER PUBLICATIONS

Nezu, Tadashi et al., "Camera to see everything", Sources of innovation, Nikkei Electronics, No. 1180, May 2017, 15 pgs (including translation).

(Continued)

*Primary Examiner* — Rebecca A Volentine
(74) *Attorney, Agent, or Firm* — Maschoff Brennan

(57)   ABSTRACT

An aspect of the present disclosure is an image creation device installed in a vehicle. The image creation device includes an image capture section and a bird's-eye view image creation section. The image capture section acquires a captured image within a peripheral range around the vehicle. The bird's-eye view image creation section creates a bird's-eye view image. The bird's-eye view image creation section includes a contour extraction section, a region discrimination section, a first creation section, a second creation section, and an image combining section. The contour extraction section extracts the contour shape of an object in the captured image. The region discrimination section judges whether the contour region is a three-dimensional object region or a road surface region. The first creation section creates a stereoscopic image, and the second creation section creates a planar view image. The image combining (Continued)

section combines the stereoscopic image and the planar view image.

4 Claims, 11 Drawing Sheets

(51) Int. Cl.
*G06K 9/00* (2006.01)
*G06K 9/46* (2006.01)
*H04N 7/18* (2006.01)

(52) U.S. Cl.
CPC ............. *G06K 9/4604* (2013.01); *H04N 7/18* (2013.01); *H04N 13/156* (2018.05)

(56) References Cited

U.S. PATENT DOCUMENTS

2016/0093057 A1* 3/2016 Lin ........................... G06T 7/74
382/154
2019/0258876 A1* 8/2019 Liu .................... G06K 9/00805

FOREIGN PATENT DOCUMENTS

| JP | 2010-109452 A | 5/2010 |
| JP | 2012-147149 A | 8/2012 |

OTHER PUBLICATIONS

Nezu, Tadashi et al., "Camera to see everything", Nikkei Electronics, Apr. 20, 2017, No. 1179, 15 pgs (including translation).

* cited by examiner

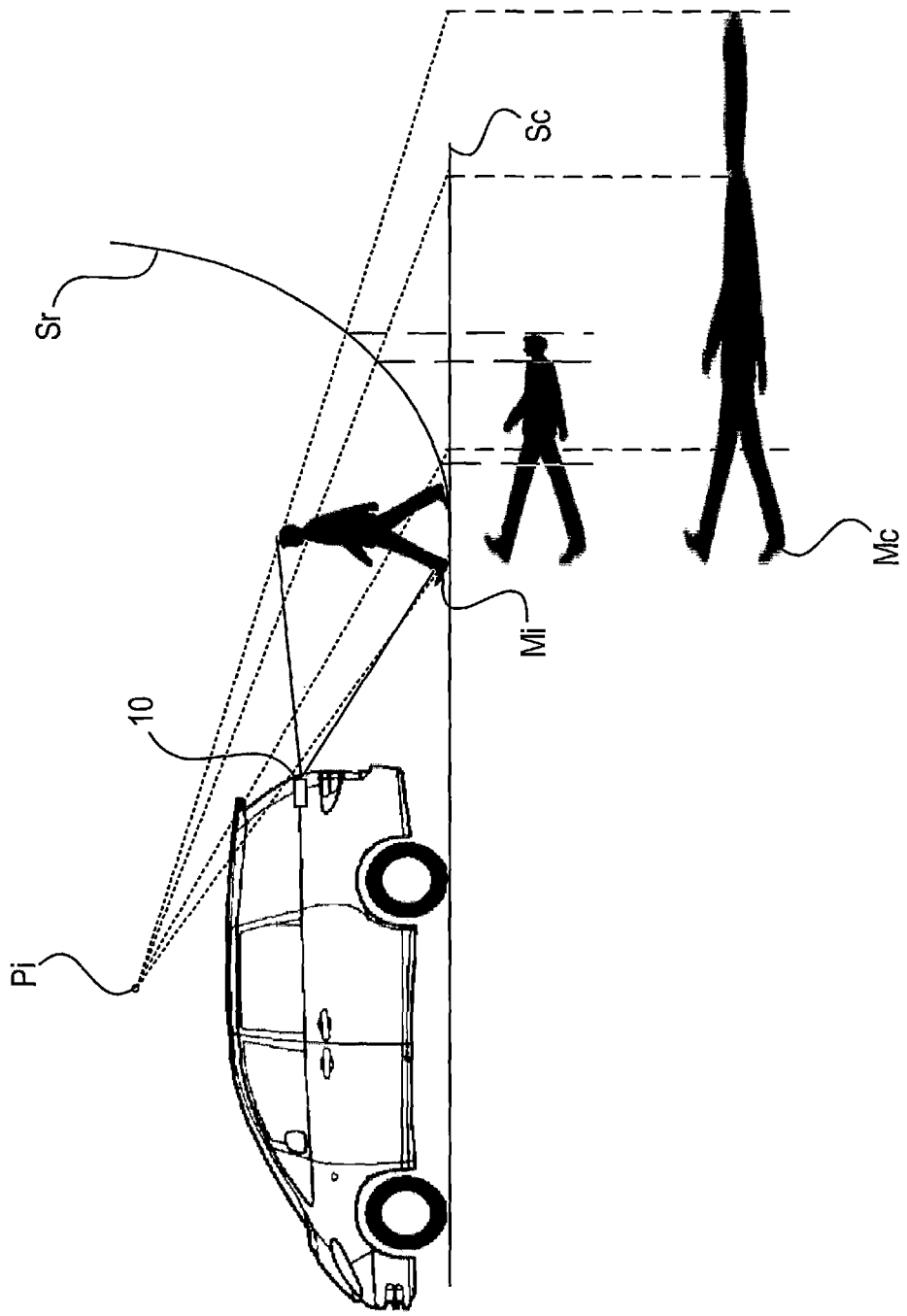

IMAGE CREATION DEVICE AND IMAGE CREATION METHOD

CROSS-REFERENCE TO RELATED APPLICATION

The present application is based on and claims the benefit of priority from earlier Japanese Patent Application No. 2018-38581 filed on Mar. 5, 2018, the description of which is incorporated herein by reference.

BACKGROUND

Technical Field

The present disclosure relates to an image creation device which creates bird's-eye view images from captured images of the surroundings of a vehicle, and an image creation method.

Related Art

Systems for assisting safe driving have been proposed which convert captured images of the surroundings of a vehicle, taken using a plurality of vehicle-mounted cameras, into a bird's-eye view image which shows the surroundings of the vehicle as projected from a virtual camera that is above the vehicle, and provide the bird's-eye view image to a driver by displaying it on a display device provided in the vehicle.

SUMMARY

As an aspect of the embodiment, an image creation device for installation in a vehicle is provided. The image creation device includes: an image capture section configured to acquire a captured image, which is an image captured by an image capture device configured to capture images within a predetermined peripheral range around the vehicle, and a bird's-eye view image creation section configured to create a bird's-eye view image, which is an image as viewed from above the vehicle, by performing a bird's-eye view image conversion, which is a process of converting the image captured by the image capture section into a bird's-eye view image.

The bird's-eye view image creation section includes: a contour extraction section configured to extract, from the captured image that is captured by the image capture section, the contour shape of an object that is present in the captured image, based on luminance and chromaticity in the captured image; a region discrimination section configured to judge, based on the contour shape that is extracted by the contour extraction section, whether the region represented by the contour shape is a three-dimensional object region, which is a region expressing a three-dimensional object, or is a road surface region, which is a region expressing something other than a three-dimensional object; a first creation section configured to create a stereoscopic image by performing stereoscopic conversion of the three-dimensional object region, with the stereoscopic conversion being processing executing coordinate conversion by projecting the three-dimensional object region onto a three-dimensional projection surface, which has a predetermined three-dimensional curvature and represents a virtual plane which slopes upward with increase of distance from an imaging position of the image capture device; a second creation section configured to create a planar view image by performing planar view conversion of the road surface region, with the planar view conversion being processing executing viewpoint conversion by projecting the road surface region onto a road surface projection surface, which is a predetermined virtual plane that represents a road surface on which the vehicle exists in real space; and an image combining section configured to combine the stereoscopic image created by the first creation section and the planar view image created by the second creation section.

BRIEF DESCRIPTION OF THE DRAWINGS

In the accompanying drawings:

FIG. 15 is a diagram illustrating differences in shape between an image created by stereoscopic processing and an image created by planar view processing.

DETAILED DESCRIPTION OF THE PREFERRED EMBODIMENTS

Figure 1:
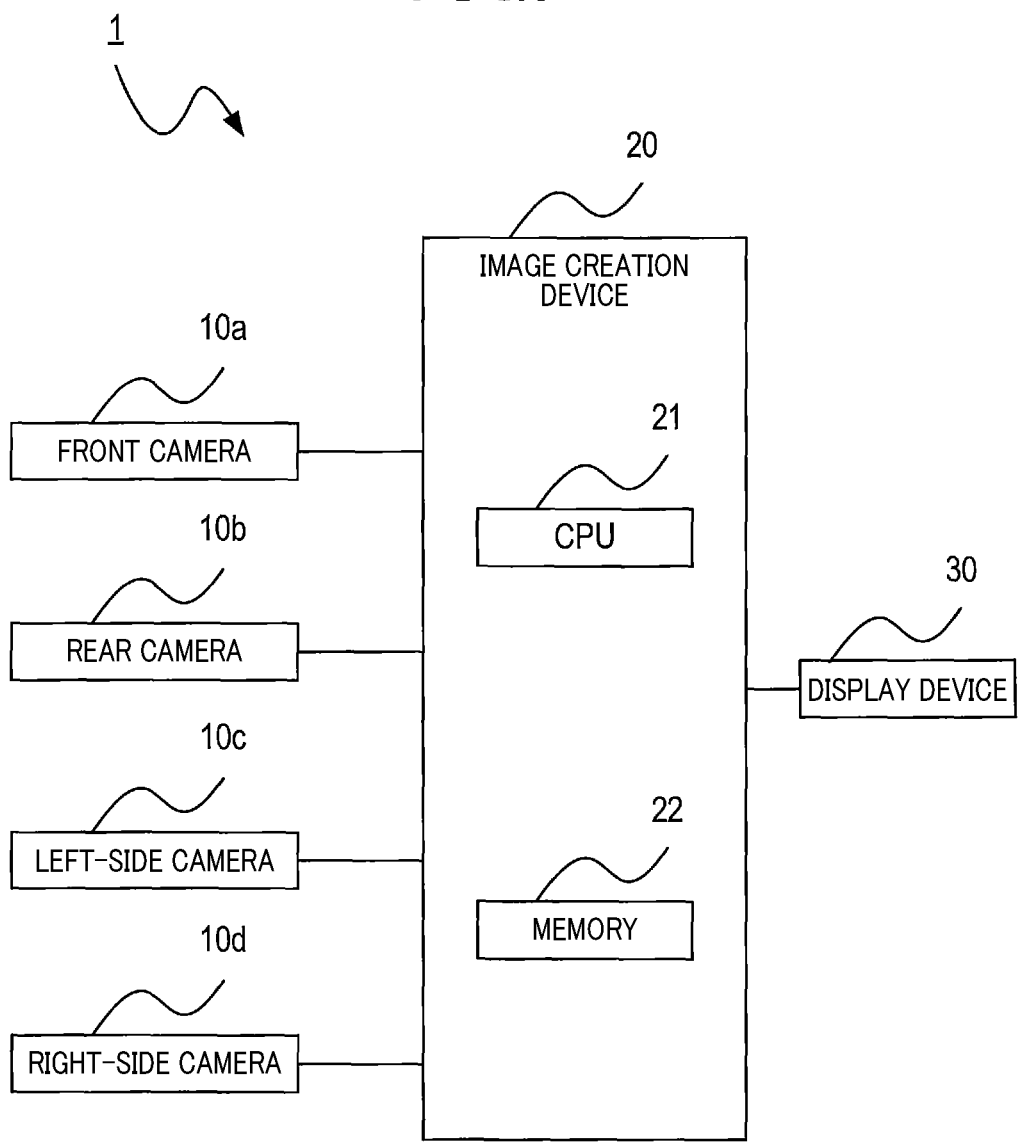
FIG. 1 is a block diagram showing a configuration of an image display system.

Systems for assisting safe driving have been proposed which convert captured images of the surroundings of a vehicle, taken using a plurality of vehicle-mounted cameras, into a bird's-eye view image which shows the surroundings of the vehicle as projected from a virtual camera that is above the vehicle, and provide the bird's-eye view image to a driver by displaying it on a display device provided in the vehicle.

In the bird's-eye view conversion that is executed for converting the captured images to the bird's-eye view image, all of the points in the captured images are subjected to coordinate conversion as points that are on the road surface. For this reason, when a three-dimensional object is present in the captured images, the farther the object is from the road surface, the greater will be the distance at which the object is recognized as appearing. As a result, a three-dimensional object that is present in the captured images is converted by the bird's-eye view conversion into a shape that is stretched along directions extending from the center of the vehicle-mounted cameras, as a central position, causing differences to be produced from an actual bird's-eye view image taken from above the vehicle. This can impart a feeling of unease to the driver of the vehicle.

On the other hand, Japanese Patent Publication No. 2007-295043 discloses a technique whereby three-dimensional object images, consisting of images representing respective three-dimensional objects, are stored beforehand, and when a three-dimensional object is detected, a composite image is obtained by combining a three-dimensional object image to form a composite image, and displaying the composite image at the position in the bird's-eye view image corresponding to the position at which the three-dimensional object is detected. In this case, three-dimensional object images are combined with the bird's-eye view image after the above-described bird's-eye view conversion has been executed, so that the bird's-eye view conversion does not cause stretching of the displayed three-dimensional objects, and hence the above-described feeling of unease is avoided.

However, as a result of a detailed study, it has been found by the inventor that, with the method described in Japanese Patent Publication No. 2007-295043, the shape, color, etc., of three-dimensional objects displayed in the composite images may not match those of the three-dimensional objects that are actually present. Hence it has been found that when such composite images are displayed, the driver may experience a feeling of unease caused by the inconsistencies in shape and color of the displayed three-dimensional objects.

It is an object of the present disclosure to provide a technology which prevents a feeling of unease from being imparted to a driver by three-dimensional objects that are displayed.

Embodiments according to the present disclosure are described in the following, referring to the drawings.

1. Configuration

As shown FIG. 1, an image display system 1 is installed in a vehicle and includes a front camera 10a, a rear camera 10b, a left-side camera 10c, a right-side camera 10d, an image creation device 20, and a display device 30. In the following, the vehicle provided with the image display system 1 is referred to as an own vehicle.

The front camera 10a, the rear camera 10b, the left-side camera 10c, and the right-side camera 10d are image capture devices which respectively capture images within a predetermined imaging range, and which each have the same basic configuration. In the following, when the front camera 10a, the rear camera 10b, the left-side camera 10c, and the right-side camera 10d are not distinguished from each other, they are referred to as image capture devices 10.

Figure 2:
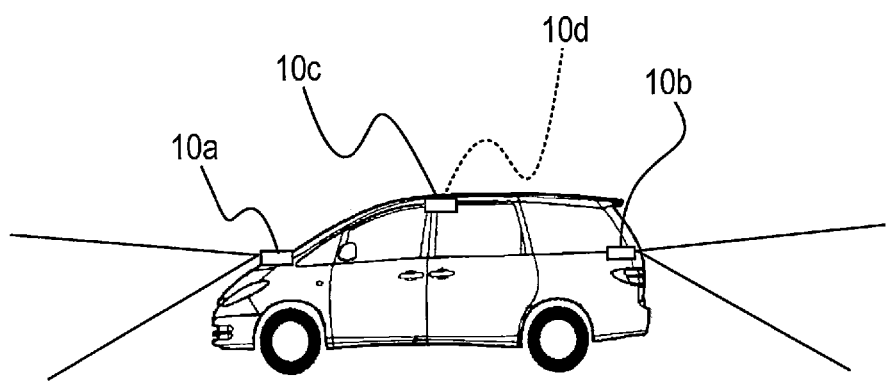
FIG. 2 is a diagram showing an example of positions where respective components are mounted in an own vehicle.

As shown in FIG. 2, the front camera 10a and the rear camera 10b are respectively installed at a front part and at a rear part of the own vehicle. Here, the "front part of the own vehicle" signifies, for example, the vicinity of the front bumper of the own vehicle, the vicinity of the rear view mirror of the own vehicle, the vicinity of the instrument panel of the own vehicle, and the like. The "rear portion of the own vehicle" signifies, for example, the vicinity of the rear bumper of the own vehicle, the vicinity of the rear door of the own vehicle in the case of a hatchback, and the like.

The left-side camera 10c and the right-side camera 10d are mounted near the center of the vehicle body, with respect to the longitudinal direction.

The front camera 10a, the rear camera 10b, the left-side camera 10c, and the right-side camera 10d are mounted such that their respective optical axes face in the forward direction of the own vehicle, face in the rearward direction of the own vehicle, face in the direction at 90° to the left with respect to the forward direction of the own vehicle, and face in the direction at 90° to the right with respect to the forward direction of the own vehicle.

The front camera 10a and the rear camera 10b perform image capture, for example, within a frontward view angular range of approximately 180° from the own vehicle and a rearward view angular range of approximately 180° from the own vehicle, respectively. The left-side camera 10c and the right-side camera 10d perform image capture, for example, within a left-side view angular range of approximately 180° from the own vehicle and a right-side view angular range of approximately 180° from the own vehicle, respectively.

The positional relationships between the front camera 10a and the left-side camera 10c, between the left-side camera 10c and the rear camera 10b, between the rear camera 10b and the right-side camera 10d, and between the right-side camera 10d and the front camera 10a respectively are referred to in the following as adjacent positional relationships. Those of the image capture devices 10 which are adjacent to one other are installed at positions where their respective imaging ranges partially overlap.

The display device 30 is mounted at a position where the driver is enabled to see the display from the driver's seat of the own vehicle, and acquires and displays composite images from the image creation device 20. The display device 30 is, for example, a well-known type of device such as a display installed on the instrument panel of the own vehicle, or a display of a car navigation system that is installed in the own vehicle.

The image creation device 20 is mainly composed of a well-known type of microcomputer, having a CPU 21 and a semiconductor memory (in the following, the memory 22) such as a RAM, a ROM, and a flash memory. Various functions of the image creation device 20 are implemented by the CPU 21 by executing a program stored in a non-transitory tangible storage medium. In this example, the memory 22 corresponds to a non-transitory tangible storage medium which stores a program. A method corresponding to the program is implemented by executing this program. It should be noted that the image creation device 20 may be constituted by one or more microcomputers.

The image creation device 20 is implemented by the CPU 21 in executing a program, however this method is not limited to software, and some or all of the elements may be implemented by using one or more hardware elements. For example, when the above functions are implemented by hardware consisting of an electronic circuit, the electronic circuit may be implemented as a digital circuit that includes a large number of logic circuits, analog circuits, or a combination thereof.

2. Process

<Image Display Process>

Figure 3:
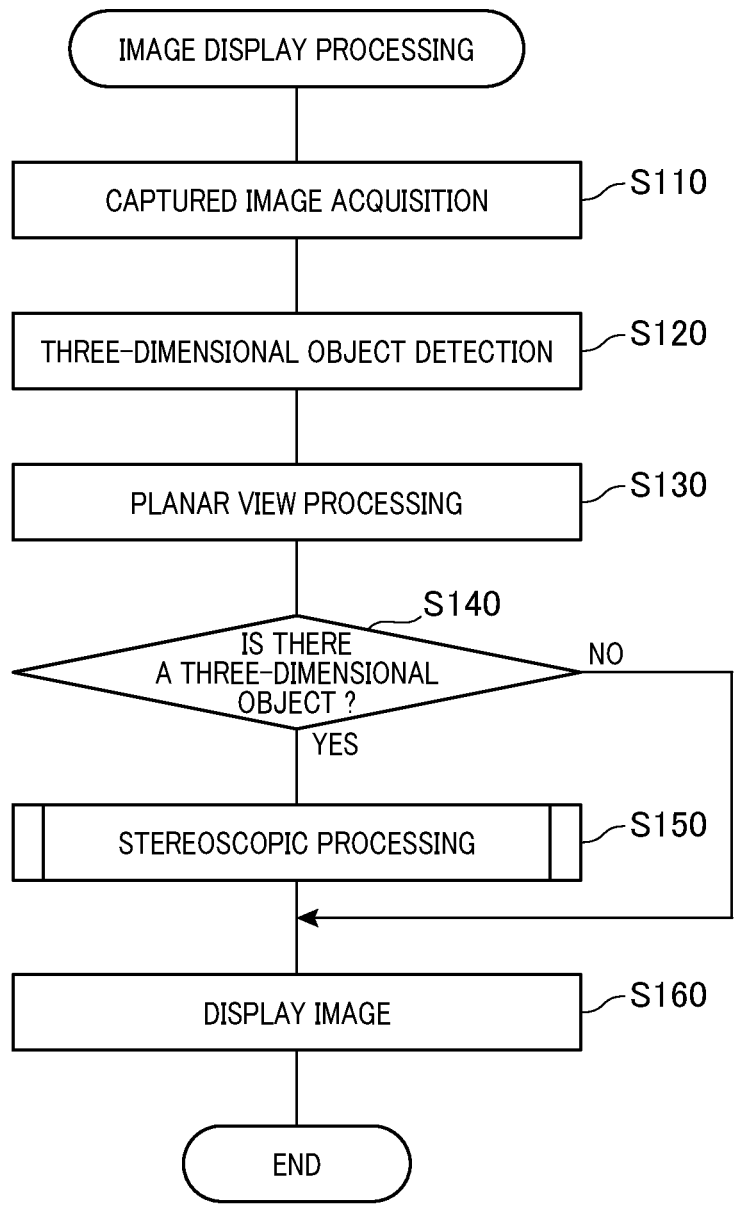
FIG. 3 is a flowchart of an image display process.

An image display process executed by the CPU 21 will next be described, referring to the flowchart in FIG. 3. The image display process is repeatedly executed when the shift lever has been set to the "R" position. The "R" position referred to here is the reverse range and is the position to which the shift lever is moved when the vehicle is to travel in reverse.

In S110, the CPU 21 acquires captured images captured by the respective image capture devices 10, that is, the front camera 10a, the rear camera 10b, the left-side camera 10c, and the right-side camera 10d.

Figure 4:
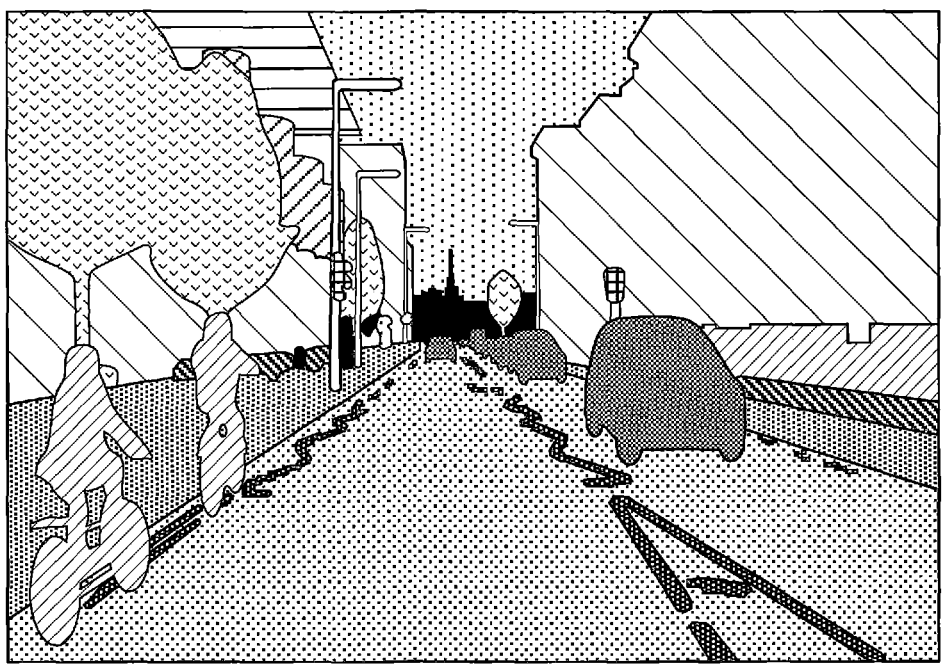
FIG. 4 is a diagram showing an example of a result of performing three-dimensional object detection on a captured image.

In S120, the CPU 21 detects any three-dimensional objects that are present in the captured images acquired in S110. Here, "three-dimensional objects" refer to tall objects such as trees and pylons at the roadside, and also include persons such as pedestrians. The detection of the three-dimensional objects is performed, for example, by applying semantic segmentation to each captured image acquired in S110. Specifically, the semantic segmentation is performed by dividing a captured image into regions based on the luminance and chromaticity of each pixel of the captured image as shown in FIG. 4, and determining the types of objects, such as pedestrians and trees at the roadside, that the divided regions represent based on the contour shapes of the divided regions. The type of object represented by a region is determined based on learning data that are generated by machine learning. When a plurality of regions representing the same type of object are detected, the regions may be recognized respectively separately, for example as a pedestrian A and a pedestrian B. If the type of object represented by a region is classified as a three-dimensional object, it is judged that the object is a three-dimensional object. The method of detecting three-dimensional objects is not limited to the use of semantic segmentation, and various methods may In S130, the CPU 21 performs planar view processing of the images acquired in S110.

Here, "planar view processing" signifies processing for creating an overall bird's-eye view image 103 by executing planar view conversion on each of the captured images and combining the converted images. "Overall bird's-eye view image 103" referred to here signifies an image converted such as to appear to look down at the road surface where the own vehicle is situated, from above the own vehicle.

Figure 5:
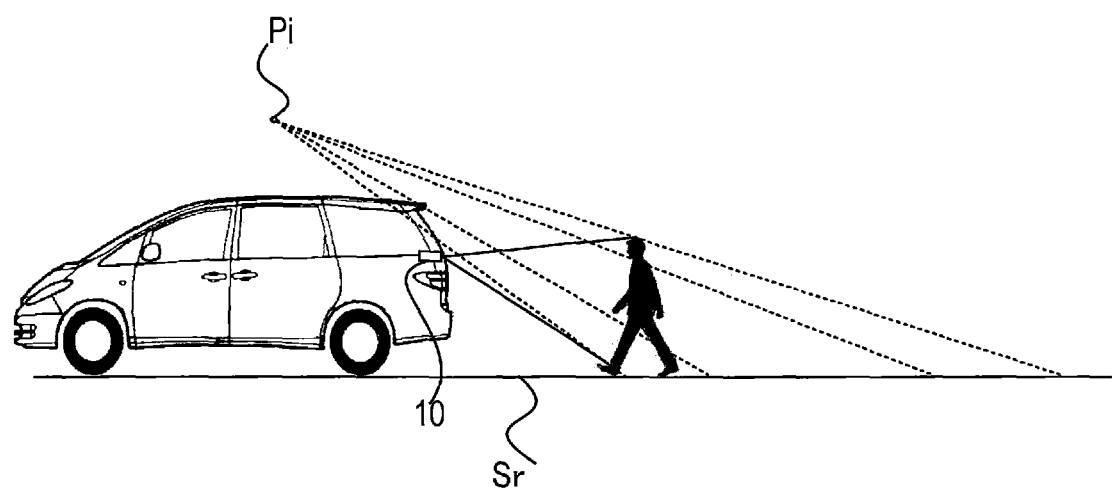
FIG. 5 is a diagram showing the shape of a road surface projection surface used in planar view processing.

"Planar view conversion" signifies, specifically, that the CPU 21 performs viewpoint conversion for viewing a road surface projection surface as seen from a virtual point Pi, where the road surface projection surface corresponds to the surface on which the own vehicle is situated, as shown in FIG. 5. The virtual point Pi is a point that is set virtually above the vehicle.

The image obtained by converting a captured image that is captured by the front camera 10a into planar view is referred to as a front bird's-eye view image 103a, and the image obtained by converting a captured image that is captured by the rear camera 10b into planar view is referred to as a rear bird's-eye view image 103b. Similarly, the image obtained by converting a captured image that is captured by the left-side camera 10c into planar view is referred to as the left-side bird's-eye view image 103c, and the image obtained by converting a captured image that is captured by the right-side camera 10d into planar view is referred to as the right-side bird's-eye view image 103d. The front bird's-eye view image 103a, the rear bird's-eye view image 103b, the left-side bird's-eye view image 103c, and the right-side bird's-eye view image 103d are also referred to as individual bird's-eye view images.

Figure 6:
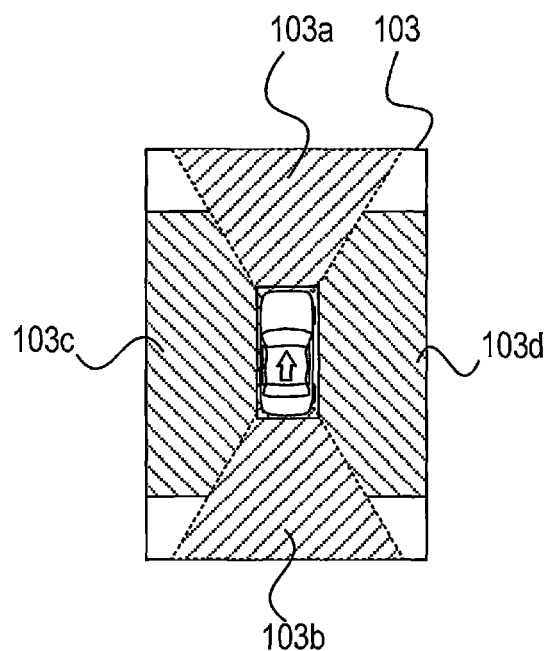
FIG. 6 is a diagram showing an overall bird's-eye view image.

As shown in FIG. 6, the CPU 21 combines the images captured by the respective image capture devices 10, consisting of the front bird's-eye view image 103a, the rear bird's-eye view image 103b, the left-side bird's-eye view image 103c, and the right-side bird's-eye view image 103d, such as to correspond to the position of the vehicle.

In S140, the CPU 21 judges, by means of the three-dimensional object detection executed in S120, whether a three-dimensional object appears in any of the captured images.

If it is judged in S140 that a three-dimensional object appears in any of the captured images, the CPU 21 moves the processing to S150.

In S150, the CPU 21 performs stereoscopic processing.

In stereoscopic processing, stereoscopic conversion, differing from planar view conversion, is executed on the three-dimensional objects that are present in the captured images, in order to suppress stretching of these objects as they appear in the bird's-eye view images, and combining processing is then executed to obtain an overall bird's-eye view image.

On the other hand, if it is determined in S140 that there are no three-dimensional objects in the captured images, the CPU 21 shifts the processing to S160

In S160, the CPU 21 displays the image created in S130 or S150 on the display device 30, then ends the image display process. It should be noted that it would be equally possible to display, as part of the created image, an image of the surroundings of the vehicle within a predetermined range.

The processing of S110 corresponds to an image capture section and an image capture step, the processing from S120 to S160 corresponds to a bird's-eye view image creation section and a bird's-eye view image creation step, and the processing of S120 corresponds to a contour extraction section, a contour extraction step, a region discrimination section, and a region discrimination step. The processing of S130 corresponds to a second creation section, a second creation step, and an overall combining section.

<Stereoscopic Processing>

Figure 7:
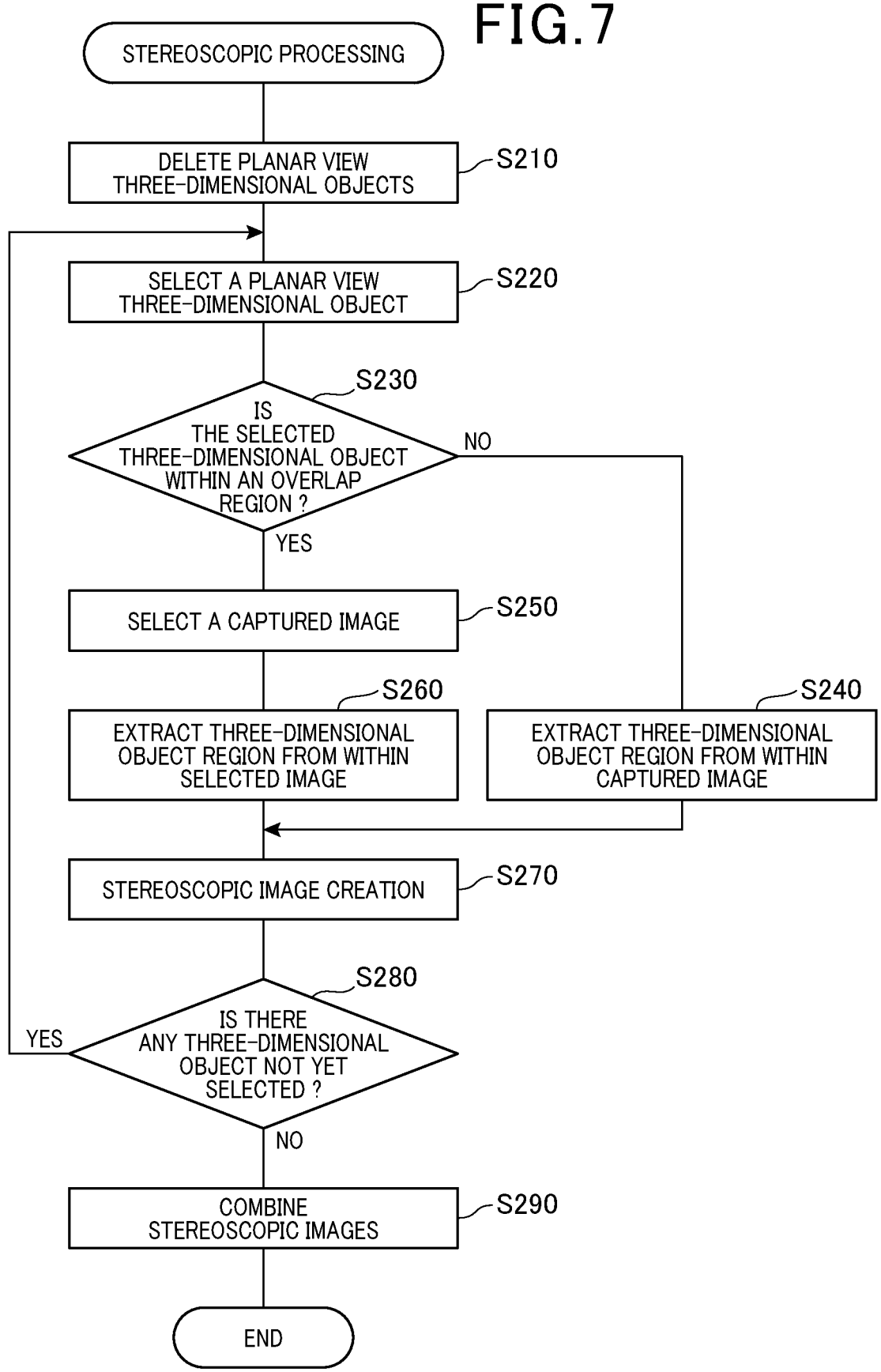
FIG. 7 is a flowchart of stereoscopic processing.

Next, the stereoscopic processing executed by the CPU 21 in S150 will be described with reference to the flowchart in FIG. 7.

Figure 8:
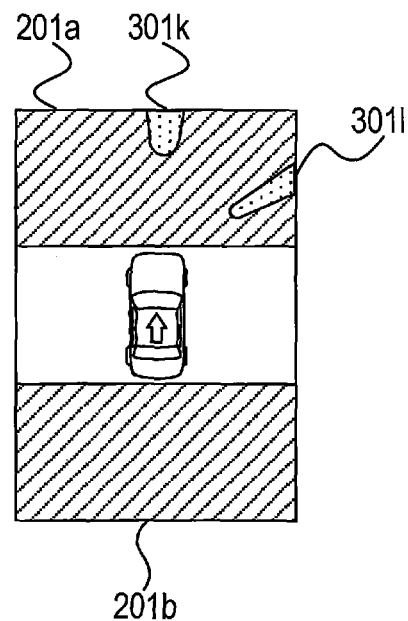
FIG. 8 is a diagram showing an example of a front bird's-eye view image 101a and a rear bird's-eye view image 101b in which three-dimensional objects are present.
Figure 9:
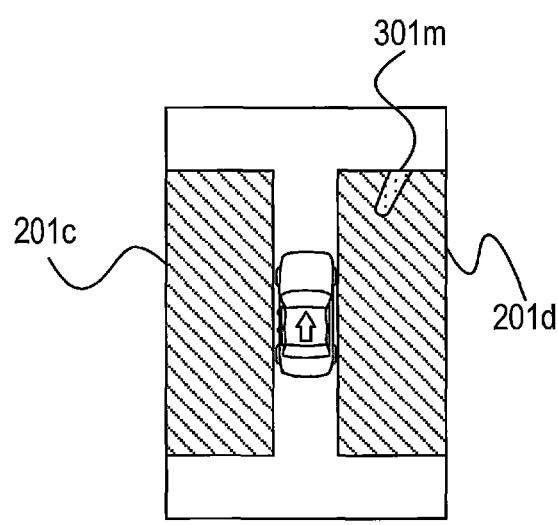
FIG. 9 is a diagram showing an example of a left-side bird's-eye view image 101c and a right-side bird's-eye view image 101d in which a three-dimensional object is present.

As an example of the planar view processing of S130, the case will be described in which the front bird's-eye view image 201a shown in FIG. 8 and the right-side bird's-eye view image 201d shown in FIG. 9 are obtained, with planar view three-dimensional objects 301k and 301l being present in the front bird's-eye view image 201a and with a planar view three-dimensional object 301m being present in the right-side bird's-eye view image 201d. Here, "planar view three-dimensional object" refers to a range representing a three-dimensional object which has been subjected to planar view conversion.

Figure 10:
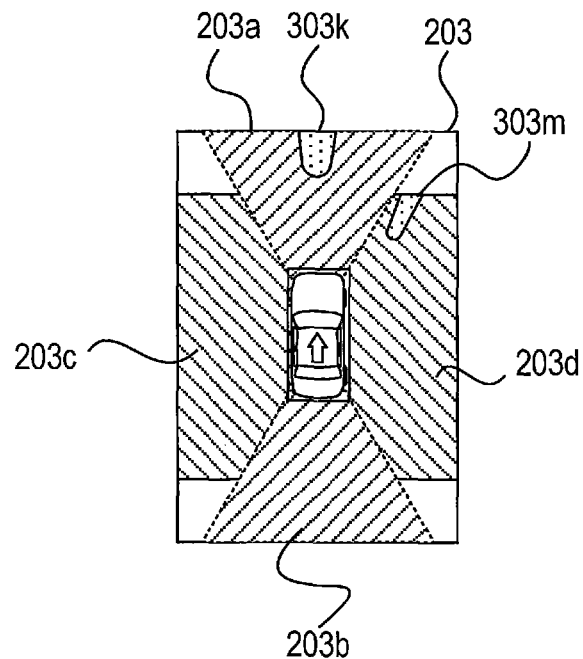
FIG. 10 is a diagram showing an overall bird's-eye view image in which three-dimensional objects are present.

The description assumes that the overall bird's-eye view image 203 shown in FIG. 10 is obtained as a result of obtaining the above-described front bird's-eye view image 201a and right-side bird's-eye view image 201d. The description also assumes that the overall bird's-eye view image 203 includes a planar view three-dimensional object 303k corresponding to the planar view three-dimensional object 301k and a planar view three-dimensional object 303m corresponding to the planar view three-dimensional object 301m.

In S210, the CPU 21 deletes the planar view three-dimensional objects from the overall bird's-eye view image 203.

Here, the deletion of the planar view three-dimensional objects may be performed, for example, by deleting the regions which were judged to be three-dimensional objects in S120 and which had been converted into planar view three-dimensional objects.

Specifically, as shown in FIG. 10, the planar view three-dimensional objects 303k and 303m that are present in the overall bird's-eye view image 203 are deleted.

In S220, the CPU 21 selects one of the planar view three-dimensional objects deleted in S210, as a selected three-dimensional object.

Specifically, for example, one of the planar view three-dimensional objects 303k and 303m that are present in the overall bird's-eye view image 203 shown in FIG. 10 is selected as the selected three-dimensional object.

Figure 11:
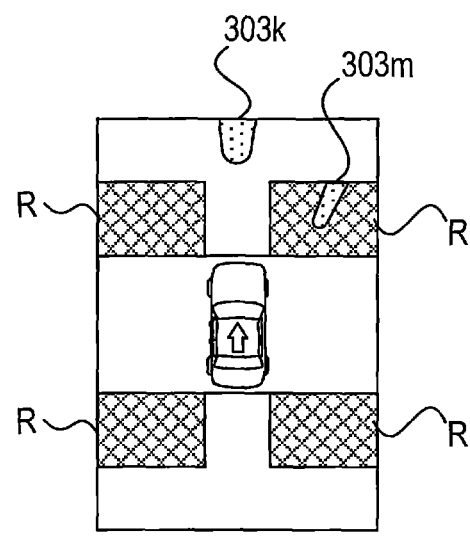
FIG. 11 is a diagram showing overlap ranges.

In S230, the CPU 21 judges whether the selected three-dimensional object selected in S220 is present within an overlap range R in the overall bird's-eye view image 203. Here, "overlap range R" signifies a range in which individual bird's-eye view images overlap, as shown in FIG. 11.

For example, the planar view three-dimensional object 303m is judged to be within an overlap range R, and the planar view three-dimensional object 303k is judged to not be within an overlap range R.

It should be noted that the decision as to whether a planar view three-dimensional object is within an overlap range R may be made based on whether the point in the planar view three-dimensional object which is closest to the vehicle is included in the overlap range R, or the decision may be made based on whether the position of the center of gravity of the planar view three-dimensional object is within the overlap range R.

If the CPU 21 judges in S230 that the selected three-dimensional object is not within an overlap range R in the overall bird's-eye view image 203, the processing proceeds to S240.

In S240, the CPU 21 extracts from the captured images a three-dimensional object region which is the region where a three-dimensional object corresponding to the selected three-dimensional object is present in the captured image, and the processing proceeds to S270. It would be equally possible for the extraction of the three-dimensional object region of the selected three-dimensional object to be performed by extracting, as the three-dimensional object region, the range within which a three-dimensional object that is of the same type as the selected three-dimensional object is present in the captured image, for example. It should be noted that when a plurality of three-dimensional objects of the same type are present in the captured image, three-dimensional object regions corresponding to the selected three-dimensional objects represented by the identification result for each of the three-dimensional objects may be extracted separately.

Alternatively, the individual bird's-eye view images that have been combined in the overall bird's-eye view image 203 may be inversely converted, and the region corresponding to the selected three-dimensional object may be extracted as the three-dimensional object region. Here, "inverse conversion" refers to conversion that is executed from an individual bird's-eye view image to a captured image, as opposed to planar view conversion, which is conversion from a captured image to an individual bird's-eye view image.

On the other hand, if the CPU 21 judges in S230 that the selected three-dimensional object is present in an overlap range R in the overall bird's-eye view image 203, the processing proceeds to S250.

Specifically, if the planar view three-dimensional object 303m has been selected as the selected three-dimensional object, it is judged that the selected three-dimensional object is present within an overlap range R in the overall bird's-eye view image 203.

In S250, one of the captured images in which the selected three-dimensional object is present within the image range is selected as the selected image.

Here, for example, the captured image in which the selected three-dimensional object is closest to the lower end of the captured image is selected as the selected image. That is, the captured image captured by the one of the image capture devices 10 that is closest to the selected three-dimensional object is selected as the selected image.

In S260, the CPU 21 extracts, from the selected image, an extraction region, taking as the extraction region, a three-dimensional object region which is in the image that was selected in S250 and in which there is a three-dimensional object corresponding to the selected three-dimensional object. The processing then proceeds to S270. The extraction of the extraction region from the selected image is performed in the same manner as the extraction of the three-dimensional object region from a captured image that is performed in S240.

In S270, the CPU 21 creates a stereoscopic image by performing stereoscopic conversion, based on the three-dimensional object region that was extracted in S240 or on the extraction region that was extracted in S260.

Figure 12:
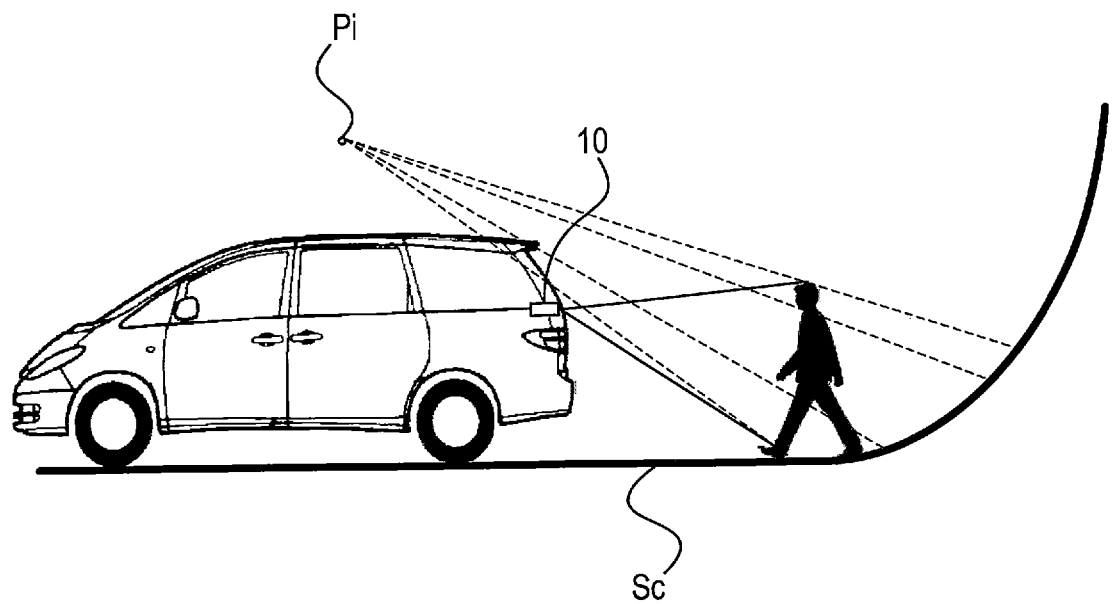
FIG. 12 is a diagram illustrating the shape of a three-dimensional projection surface used in stereoscopic processing.
Figure 13:
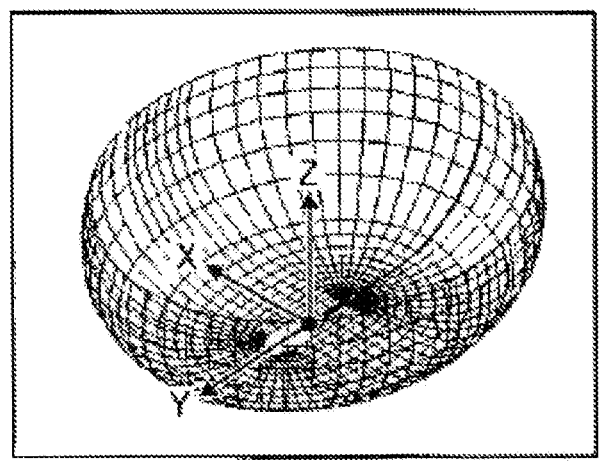
FIG. 13 is a diagram showing the entire shape of a three-dimensional projection surface used in stereoscopic processing.

Here, the stereoscopic image is created by projecting the three-dimensional object region that was extracted in S240 or the extraction region that was extracted in S260 onto a three-dimensional projection surface Sr, representing a predetermined curved surface as shown in FIG. 12. The three-dimensional projection surface Sr is a virtual curved surface having a predetermined three-dimensional curvature, and inclines upward and outward from the imaging position of the image capture device, as shown in FIG. 13.

The three-dimensional projection surface Sr is predetermined such that the origin position thereof corresponds to the center position of the own vehicle. The X-axis direction expresses the vehicle width direction of the own vehicle, the Y-axis direction expresses the travel direction of the own vehicle, and the Z-axis direction expresses the height direction of the own vehicle.

In S280, the CPU 21 judges whether there is any three-dimensional object that is in the overall bird's-eye view image 203 and has not yet been selected in S220.

If the CPU 21 judges in S280 that there is a three-dimensional object in the overall bird's-eye view image 203 that has not yet been selected in S220, the CPU 21 shifts the processing to S220 and performs the subsequent processing That is, the processing from S220 to S280 is performed repetitively until all of the three-dimensional objects that are present in the overall bird's-eye view image 203 have been subjected to stereoscopic conversion. The three-dimensional objects that are selected in executions of S220 consist of the planar view three-dimensional objects that have not yet been selected.

On the other hand, if the CPU 21 judges in S280 that there is no three-dimensional object that has not yet been selected in S220 in the overall bird's-eye view image 203, that is, if all the three-dimensional objects in the overall bird's-eye view image 203 have been selected, the CPU 21 shifts the processing to S290.

In S290, the CPU 21 combines the stereoscopic image created in S270 with the overall bird's-eye view image 203, at the position where the three-dimensional object appeared in the overall bird's-eye view image 203, and ends the processing. If there are a plurality of the stereoscopic images, they are respectively combined with the overall bird's-eye view image 203.

Figure 14:
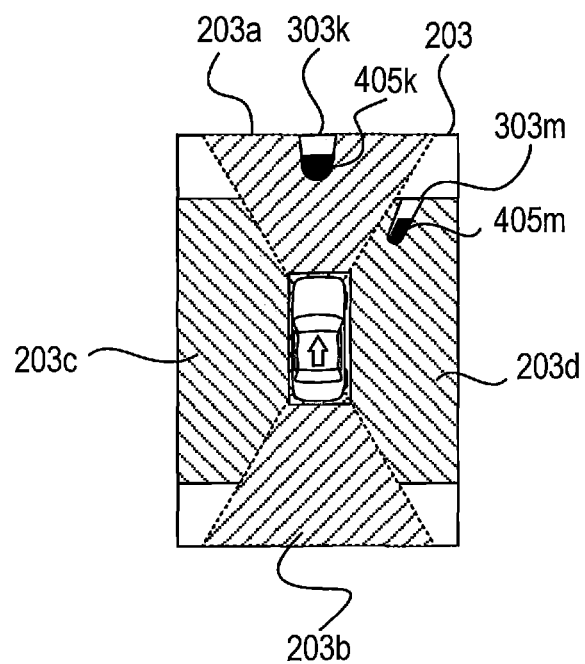
FIG. 14 is a diagram showing stereoscopic images created by stereoscopic processing.

As shown in FIG. 14 for example, the combining of a stereoscopic image may be performed by positioning the lower end portion of the stereoscopic image at the point that is closest to the own vehicle, within the range of the corresponding three-dimensional object that was deleted in S210. However, the combining of a stereoscopic image is not limited to such a method, and for example may be performed such as to make the position of the center of gravity of the stereoscopic image coincide with the center of gravity of the range in which the three-dimensional object appeared in the overall bird's-eye view image 203.

The processing of S230 corresponds to an object identification section, the processing of S250 and S260 corresponds to a region extraction section, the processing of S270 corresponds to a first creation section, a first creation step, and a selective conversion section, and the processing of S290 corresponds to an image combining section, an image combining step, and a combining execution section.

3. Effects

The following effects are provided by the embodiment described above.

(1) The above embodiment can, by displaying stereoscopic images, prevent feelings of unease from being experienced by a driver.

That is, with the present embodiment, stereoscopic images are created which are based on three-dimensional objects that are present in captured images. Hence, for example, it is possible to suppress a feeling of discomfort from being imparted to the driver due to displaying a bird's-eye view image in which three-dimensional objects have colors that are different from those of the actual three-dimensional objects.

(2) Furthermore, with the present embodiment, stereoscopic conversion, differing from planar view conversion, is performed on three-dimensional object regions, which are regions in which respective three-dimensional objects are present in a captured image. By performing this stereoscopic conversion, it is possible to prevent the displayed three-dimensional objects from becoming stretched. As a result, it is possible to suppress feelings of discomfort that may be felt by the driver in the case in which an identical bird's-eye view conversion is applied to a three-dimensional object and to a plane.

Specifically, as shown in FIG. 15, when the image Mc obtained by projecting a three-dimensional object Mi onto a road surface projection surface Sc is compared with the shape of the actual three-dimensional object Mi, it can be seen that a tip portion of the three-dimensional object Mi which is far from the ground, in particular the part corresponding to the head in the case of a three-dimensional object that is a pedestrian, appears greatly elongated in the image Mc, compared to other parts of the three-dimensional object. On the other hand, the image Mr that is obtained by projection onto the three-dimensional projection surface Sr is less elongated than the image Mc, and the tip portion of the object is prevented from becoming greatly stretched by comparison with the other portions.

By performing such stereoscopic conversion of the three-dimensional object regions, it is possible to prevent a feeling of discomfort from being imparted to the driver.

4. Other Embodiments

The present disclosure has been described above with respect to an embodiment, however the disclosure is not limited to that embodiment, and various changes may be effected.

(1) With the above embodiment, the type of three-dimensional object represented by a region is judged from the contour shape of the region, with the judgement being based on semantic segmentation, however it would be equally possible to only judge whether a region represents a three-dimensional object.

(2) With the above embodiment, captured images are acquired from a plurality of image capture devices 10, however the number of image capture devices 10 is not limited to a plurality, and may be one. That is, the above-described bird's-eye view image conversion may be performed on a single captured image.

(3) A plurality of functions of one constituent element in the above embodiment may be implemented by a plurality of constituent elements, or one function of a single constituent element may be implemented by a plurality of constituent elements. Furthermore, a plurality of functions of a plurality of constituent elements may be implemented by a single constituent element, or one function that is implemented by a plurality of constituent elements may be implemented by a single constituent element. Furthermore, a part of the configuration of the above embodiment may be omitted. Furthermore, at least a part of the configuration of the above embodiment may be added to or replaced with respect to the configuration of another embodiment.

(4) In addition to the above-described image creation device, the present disclosure may be implemented in various forms, such as a system having the image creation device as a constituent element, a program for causing a computer to function as the image creation device, and a non-transitory tangible storage medium such as a semiconductor memory storing the program, an image creation method, etc.

An aspect of the present disclosure is an image creation device (20) for installation in a vehicle. The image creation device includes an image capture section (S110) and a bird's-eye view image creation section (S120 to S160). The image capture section is configured to acquire a captured image, which is an image captured by an image capture device (10) configured to capture images within a predetermined peripheral range around the vehicle. The bird's-eye view image creation section is configured to create a bird's-eye view image, which is an image as viewed from above the vehicle, by performing a bird's-eye view image conversion, which is a process of converting the image captured by the image capture section into a bird's-eye view image. The bird's-eye view image creation section includes a contour extraction section (S120), a region discrimination section (S120), a first creation section (S270), a second creation section (S130), and an image combining section (S290). The contour extraction section is configured to extract, from the captured image that is captured by the image capture section, the contour shape of an object that is present in the captured image, based on luminance and chromaticity in the captured image. The region discrimination section is configured to judge, based on the contour shape that is extracted by the contour extraction section, whether the region represented by the contour shape is a three-dimensional object region, which is a region expressing a three-dimensional object, or is a road surface region, which is a region expressing something other than a three-dimensional object. The first creation section is configured to create a stereoscopic image by performing stereoscopic conversion of the three-dimensional object region, with the stereoscopic conversion being processing executing coordinate conversion by projecting the three-dimensional object region onto a three-dimensional projection surface, which has a predetermined three-dimensional curvature and represents a virtual plane which slopes upward with increase of distance from an imaging position of the image capture device. The second creation section is configured to create a planar view image by performing planar view conversion of the road surface region, with the planar view conversion being processing executing viewpoint conversion by projecting the road surface region onto a road surface projection surface, which is a predetermined virtual plane that represents a road surface on which the vehicle exists in real space. The image combining section is configured to combine the stereoscopic image created by the first creation section and the planar view image created by the second creation section.

Another aspect of the present disclosure is an image creation method (20) that causes an image creation device for installation in a vehicle to create an image. The image creation method includes an image capture step (S110) and a bird's-eye view image creation step (S120 to S160). The image capture step is configured to acquire a captured image, which is an image captured by an image capture device (10) configured to capture images within a predetermined peripheral range around the vehicle. The bird's-eye view image creation step is configured to create a bird's-eye view image, which is an image as viewed from above the vehicle, by performing a bird's-eye view image conversion, which is a process of converting the image captured by the image capture step into a bird's-eye view image. The bird's-eye view image creation step includes a contour extraction step (S120), a region discrimination step (S120), a first creation step (S270), a second creation step (S130), and an image combining step (S290). The contour extraction step is configured to extract, from the captured image that is captured by the image capture step, the contour shape of an object that is present in the captured image, based on luminance and chromaticity in the captured image. The region discrimination step is configured to judge, based on the contour shape that is extracted by the contour extraction step, whether the region represented by the contour shape is a three-dimensional object region, which is a region expressing a three-dimensional object, or is a road surface region, which is a region expressing something other than a three-dimensional object. The first creation step is configured to create a stereoscopic image by performing stereoscopic conversion of the three-dimensional object region, with the stereoscopic conversion being processing executing coordinate conversion by projecting the three-dimensional object region onto a three-dimensional projection surface, which has a predetermined three-dimensional curvature and representing a virtual plane which slopes upward with increase of distance from an imaging position of the image capture device. The second creation step is configured to create a planar view image by performing planar view conversion of the road surface region, with the planar view conversion being processing executing viewpoint conversion by projecting the road surface region onto a road surface projection surface, which is a predetermined virtual plane that represents a road surface on which the vehicle exists in real space. The image combining step is configured to combine the stereoscopic image created by the first creation step and the planar view image created by the second creation step.

With such a configuration, it is possible to prevent three-dimensional objects from being stretched when displayed in a bird's-eye view image, thus preventing a feeling of unease from being imparted to the driver due to three-dimensional objects being displayed with a stretched shape.

What is claimed is:

1. An image creation device for installation in a vehicle, comprising:
  an image capture section configured to acquire a captured image, which is an image captured by an image capture device configured to capture images within a predetermined peripheral range around the vehicle, and
  a bird's-eye view image creation section configured to create a bird's-eye view image, which is an image as viewed from above the vehicle, by performing a bird's-eye view image conversion, which is a process of converting the image captured by the image capture section into a bird's-eye view image;
  wherein the bird's-eye view image creation section comprises:
    a contour extraction section configured to extract, from the captured image that is captured by the image capture section, a contour shape of an object that is present in the captured image, based on luminance and chromaticity in the captured image;
    a region discrimination section configured to judge, based on the contour shape that is extracted by the contour extraction section, whether a region represented by the contour shape is a three-dimensional object region, which is a region expressing a three-dimensional object, or is a road surface region, which is a region expressing something other than a three-dimensional object;
    a first creation section configured to create a stereoscopic image by performing stereoscopic conversion of the three-dimensional object region, with the stereoscopic conversion being processing executing coordinate conversion by projecting the three-dimensional object region onto a three-dimensional projection surface, which has a predetermined three-dimensional curvature and represents a virtual plane which slopes upward with increase of distance from an imaging position of the image capture device;
    a second creation section configured to create a planar view image by performing planar view conversion of the road surface region, with the planar view conversion being processing executing viewpoint conversion by projecting the road surface region onto a road surface projection surface, which is a predetermined virtual plane that represents a road surface on which the vehicle exists in real space; and
    an image combining section configured to combine the stereoscopic image created by the first creation section and the planar view image created by the second creation section,
    wherein the image capture section is configured to acquire a plurality of captured images from a plurality of image capture devices, installed such as to have an overlap range in which respective imaging ranges of the plurality of image capture devices overlap with one other,
    the bird's-eye view image creation section is configured to create a plurality of individual bird's-eye view images by executing the planar view conversion on each of the plurality of captured images acquired by the image capture section, and the image creation device further comprises an overall combining section configured to create an overall bird's-eye view image by combining the plurality of individual bird's-eye view images, wherein the region discrimination section comprises an object identification section, an image selection section, a region extraction section and a selective conversion section, the object identification section being configured to identify three-dimensional objects that are within the overlap range of the captured images, the image selection section being configured such that when a three-dimensional object that is identified by the object identification section is present within the overlap range of the captured images, a captured image in which the identified three-dimensional object is closest to a lower end of the captured image is selected as a selected image from among the plurality of captured images, the region extraction section being configured to extract the three-dimensional object region that is present closest to the lower end of the selected image, and the selective conversion section being configured to create the stereoscopic image by performing the stereoscopic conversion of the extracted three-dimensional object region, and wherein the image combining section is configured to combine the stereoscopic image created by the selective conversion section with the planar view image, at a position within the planar view image corresponding to the extracted three-dimensional object region.

2. The image creation device according to claim 1, wherein the image combining section comprises a combining execution section, configured to combine the stereoscopic image with the three-dimensional object region of the planar view image, created by the second creation section, such as to match the position corresponding to the lower end of the three-dimensional object region with the lower end of the stereoscopic image.

3. The image creation device according to claim 1, wherein the region discrimination section is configured to judge whether an object is a three-dimensional object by using semantic segmentation.

4. An image creation method that causes an image creation device for installation in a vehicle to create an image, comprising:

an image capture step configured to acquire a captured image, which is an image captured by an image capture device configured to capture images within a predetermined peripheral range around the vehicle, and a bird's-eye view image creation step configured to create a bird's-eye view image, which is an image as viewed from above the vehicle, by performing a bird's-eye view image conversion, which is a process of converting the image captured by the image capture step into a bird's-eye view image;

wherein the bird's-eye view image creation step comprises:

a contour extraction step configured to extract, from the captured image that is captured by the image capture step, a contour shape of an object that is present in the captured image, based on luminance and chromaticity in the captured image;

a region discrimination step configured to judge, based on the contour shape that is extracted by the contour extraction step, whether a region represented by the contour shape is a three-dimensional object region, which is a region expressing a three-dimensional object, or is a road surface region, which is a region expressing something other than a three-dimensional object;

a first creation step configured to create a stereoscopic image by performing stereoscopic conversion of the three-dimensional object region, with the stereoscopic conversion being processing executing coordinate conversion by projecting the three-dimensional object region onto a three-dimensional projection surface, which has a predetermined three-dimensional curvature and representing a virtual plane which slopes upward with increase of distance from an imaging position of the image capture device;

a second creation step configured to create a planar view image by performing planar view conversion of the road surface region, with the planar view conversion being processing executing viewpoint conversion by projecting the road surface region onto a road surface projection surface, which is a predetermined virtual plane that represents a road surface on which the vehicle exists in real space; and an image combining step configured to combine the stereoscopic image created by the first creation step and the planar view image created by the second creation step, wherein the image capture step is configured to acquire a plurality of captured images from a plurality of image capture devices, installed such as to have an overlap range in which respective imaging ranges of the plurality of image capture devices overlap with one other, the bird's-eye view image creation step is configured to create a plurality of individual bird's-eye view images by executing the planar view conversion on each of the plurality of captured images acquired by the image capture step, and the image creation device further comprises an overall combining step configured to create an overall bird's-eye view image by combining the plurality of individual bird's-eye view images, wherein the region discrimination step comprises an object identification step, an image selection step, a region extraction step, and a selective conversion step, the object identification step being configured to identify three-dimensional objects that are within the overlap range of the captured images, the image selection step being configured such that when a three-dimensional object that is identified by the object identification step is present within the overlap range of the captured images, a captured image in which the identified three-dimensional object is closest to a lower end of the captured image is selected as a selected Image from among the plurality of captured images, the region extraction step being configured to extract the three-dimensional object region that is present closest to the lower end of the selected image, and the selective conversion step being configured to create the stereoscopic image by performing the stereoscopic conversion of the extracted three-dimensional object region, and wherein the image combining step is configured to combine the stereoscopic image created by the selective conversion step with the planar view image, at a position within the planar view image corresponding to the extracted three-dimensional object region.

\* \* \* \* \*